(12) United States Patent
Smith, III

(10) Patent No.: US 6,511,043 B2
(45) Date of Patent: Jan. 28, 2003

(54) FEMALE COUPLING MEMBER WITH RECESSED FLOW PASSAGES

(75) Inventor: Robert E. Smith, III, Missouri City, TX (US)

(73) Assignee: National Coupling Company, Inc., Stafford, TX (US)

( * ) Notice: Subject to any disclaimer, the term of this patent is extended or adjusted under 35 U.S.C. 154(b) by 0 days.

(21) Appl. No.: 09/895,447

(22) Filed: Jun. 29, 2001

(65) Prior Publication Data
US 2003/0001126 A1 Jan. 2, 2003

(51) Int. Cl.⁷ ................................................ F16L 37/28
(52) U.S. Cl. ................... 251/149.6; 251/149.7
(58) Field of Search ...................... 137/614.04, 614.03, 137/614.05, 614; 251/149.6, 149.7, 149.1

(56) References Cited

U.S. PATENT DOCUMENTS

| | | |
|---|---|---|
| 2,320,339 A | 6/1943 | Buttner |
| 2,471,237 A | 5/1949 | Pasturczak |
| 2,599,935 A | 6/1952 | Pasker |
| 2,645,450 A | 7/1953 | Chessman |
| 2,727,759 A | 12/1955 | Elliott |
| 2,727,761 A | 12/1955 | Elliott et al. |
| 2,772,898 A | 12/1956 | Seeler |
| 3,291,152 A | 12/1966 | Comer |
| 3,551,005 A | 12/1970 | Brun |
| 3,567,255 A * | 3/1971 | Evans .................. 251/149.6 X |
| 4,098,292 A * | 7/1978 | Evans .................. 251/149.6 X |
| 4,214,607 A | 7/1980 | Bouteille |
| 4,398,561 A * | 8/1983 | Maldavs ............... 251/149.6 X |
| 4,453,566 A | 6/1984 | Henderson, Jr. et al. |
| 4,506,863 A | 3/1985 | Quin et al. |
| 4,597,413 A | 7/1986 | Buseth |
| 4,637,470 A | 1/1987 | Weathers et al. |
| 4,694,859 A | 9/1987 | Smith, III |
| 4,696,326 A * | 9/1987 | Sturgis ................. 251/149.6 X |
| 4,703,774 A | 11/1987 | Seehausen |
| 4,709,726 A | 12/1987 | Fitzgibbons |
| 4,754,780 A | 7/1988 | Smith, III |
| 4,768,538 A | 9/1988 | Mintz et al. |
| 4,813,454 A | 3/1989 | Smith, III |
| 4,832,080 A | 5/1989 | Smith, III |
| 4,834,139 A | 5/1989 | Fitzgibbons |
| 4,924,902 A | 5/1990 | Lewis et al. |
| 4,924,909 A | 5/1990 | Wilcox |
| 5,063,965 A | 11/1991 | Wilcox |
| 5,099,882 A | 3/1992 | Smith, III |
| 5,203,374 A | 4/1993 | Smith, III |
| 5,232,021 A | 8/1993 | Smith |
| 5,284,183 A * | 2/1994 | Smith, III ............... 137/614.04 |
| 5,343,891 A | 9/1994 | Bosley |
| 5,360,035 A | 11/1994 | Smith |
| 5,368,070 A | 11/1994 | Bosley |
| 5,390,702 A | 2/1995 | Smith, III |
| 5,406,980 A | 4/1995 | Allread et al. |
| 5,692,538 A | 12/1997 | Smith, III |
| 5,762,106 A | 6/1998 | Smith, III |
| 6,085,785 A | 7/2000 | Smith, III |
| 6,123,103 A | 9/2000 | Smith, III |
| 6,202,690 B1 | 3/2001 | Smith, III |
| 6,206,040 B1 | 3/2001 | Smith, III |
| 6,227,245 B1 | 5/2001 | Smith, III |
| 6,283,444 B1 | 9/2001 | Smith, III |

\* cited by examiner

Primary Examiner—Kevin Lee
(74) Attorney, Agent, or Firm—Trop, Pruner & Hu, P.C.

(57) ABSTRACT

An undersea hydraulic coupling member is disclosed having recessed flow passages to facilitate connection to opposing coupling members having radial, angled or longitudinal flow passages. The recessed flow passages of the coupling member permit these connections without reduced hydraulic fluid flow.

10 Claims, 1 Drawing Sheet

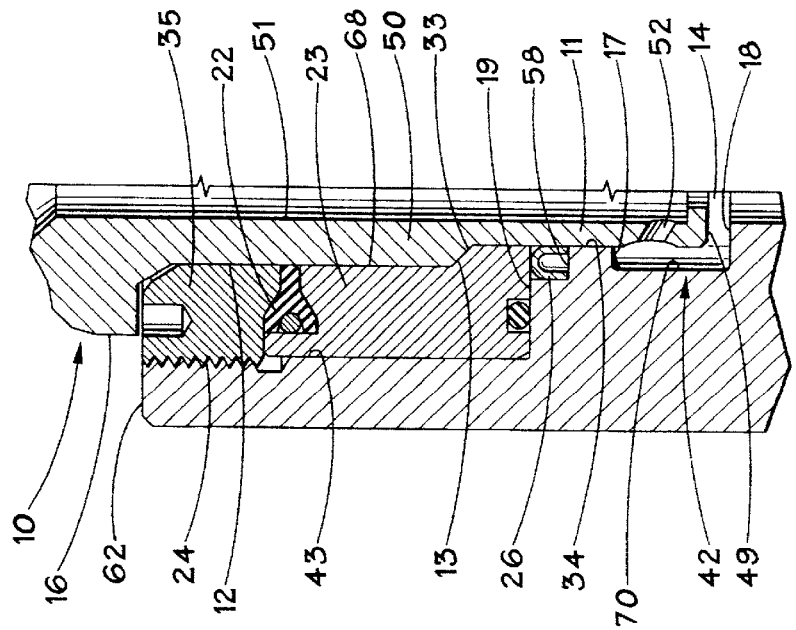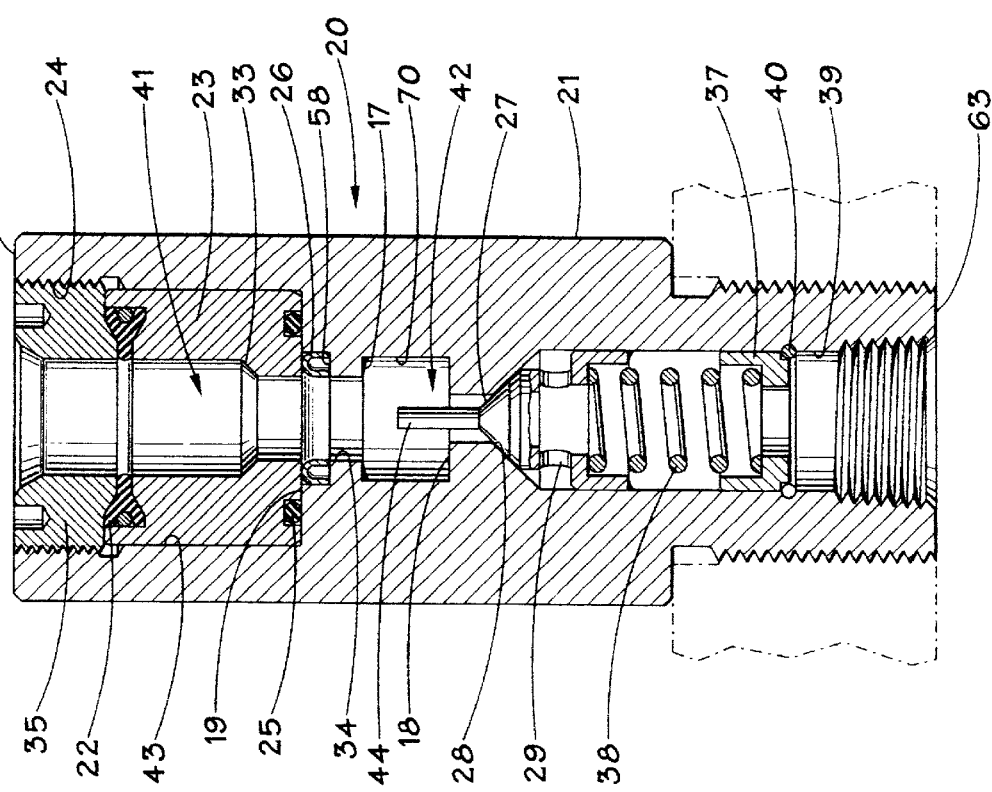

FEMALE COUPLING MEMBER WITH RECESSED FLOW PASSAGES

BACKGROUND OF THE INVENTION

1. Field of the Invention

This invention relates in general to hydraulic couplings, and specifically to hydraulic couplings used in undersea drilling and production applications. More particularly, this invention involves a female hydraulic coupling member having recessed flow passages that facilitate connection to male coupling members.

2. Description of Related Art

Subsea hydraulic couplings are old in the art. The couplings generally consist of a male member and a female member with sealed fluid passageways connecting therebetween. The female member generally is a cylindrical body with a relatively large diameter longitudinal bore at one end and a relatively small diameter longitudinal bore at the other. The small bore facilitates connections to hydraulic lines, while the large bore seals and slidingly engages the male member of the coupling. The male member includes a cylindrical portion at one end having an outer diameter approximately equal to the diameter of the large bore of the female member of the coupling. The male member also includes a connection at its other end to facilitate connection to hydraulic lines. When the cylindrical portion of the male member is inserted into the large bore of the female member, according to various embodiments of the device, fluid flow is established between the male and female members. Couplings of this type are shown in U.S. Pat. No. 4,694,859 to Robert E. Smith, III and other patents owned by National Coupling Company, Inc. of Stafford, Tex.

In undersea drilling and production applications, the male member of the coupling may be connected to a manifold plate or other securement at a subsea location at the inside or outside of a well bore. The female members, which also may be secured to a manifold plate, are moved into position over the male members and then lowered onto the male members by a diver or subsea vehicle. When the female members are positioned on the male members, hydraulic fluid flow typically is from the female member to the male member of each coupling. In some cases, only the female member of the coupling has a poppet valve.

The poppet valve typically includes a conical valve face which seats, in the closed position, against a valve seat in the coupling member. The poppet valve opens to allow fluid flow, and closes against the valve seat within the bore to arrest the flow. Generally, the poppet valve is spring-biased to the closed position. The valve may include a valve actuator which may be a nose or stem extending from the apex of the valve face along the longitudinal axis of the poppet valve.

In the couplings of U.S. Pat. No. 4,694,859, for example, hydraulic fluid flows longitudinally between the male and female coupling members. A number of different improvements and variations have been introduced in the configuration of flow ports and flow passages in couplings used for undersea applications. Some undersea hydraulic couplings are pressure balanced, for example, which may be achieved by hydraulic flow through aligned radial flow passages in the coupling members. The radial flow passages are generally perpendicular to the longitudinal axis of the coupling, so hydraulic pressure tending to separate the coupling members is significantly reduced. In the male coupling members, radial passages typically extend from the central bore outward to the cylindrical outer surface of the probe. Examples of pressure balanced couplings are shown in U.S. Pat. Nos. 4,754,780, 5,099,882, and 4,832,080 to Robert E. Smith III, assigned to National Coupling Company, Inc.

Male undersea hydraulic coupling members also may include flow ports that are angled to prevent ingress of debris when the coupling members are disconnected. Frequently, well bores in which the couplings are positioned are full of debris. The male member, which remains subsea when the coupling is disconnected, is subject to debris accumulating in flow passages. The debris may contaminate the hydraulic fluid or cause wear to the seals and sealing surfaces in hydraulic couplings and hydraulic systems. To reduce or eliminate this problem, couplings such as those of U.S. Pat. No. 5,692,538 to Robert E. Smith, III have utilized angled flow ports that prevent ingress of debris into the hydraulic lines.

In the past, each of these male coupling members could be effectively connected only to certain female coupling members. For example, pressure balanced male coupling members with radial flow passages could only be connected to female coupling members having matching radial flow passages. Male coupling members with angled flow ports could be connected to conventional female coupling members configured for longitudinal flow of hydraulic fluid, but hydraulic flow between the angled flow passages, through the annulus between the male and female members, and the female member, was somewhat reduced. Accordingly, a female coupling member is needed to be connectable to a variety of different male coupling members without significant reduction in the flow of hydraulic fluid or other performance degradation.

SUMMARY OF THE INVENTION

The present invention resides in a female undersea hydraulic coupling member having recessed flow passages to facilitate flow of hydraulic fluid with male coupling members having flow passages that are either longitudinal, radial or angled. The recessed flow passages in the female coupling member allow interconnection with various different male member flow passage configurations without significant reduction in volume or flow rates. The recessed flow passages are machined in the body section of the female member.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

FIG. 1 is a section view of a female member of a coupling according to a preferred embodiment of the present invention.

FIG. 2 is an expanded section view of a recessed flow passage in a female member of a coupling according to a preferred embodiment of the present invention, with a male coupling member inserted therein.

DETAILED DESCRIPTION OF THE PREFERRED EMBODIMENTS

As shown in FIG. 1, female coupling member 20 includes body section 21 with a first end 62 and second end 63. The second end of the female member may be threaded for attachment to a manifold plate. The female member has a central bore 41 from the first end to the second end thereof. Adjacent the first end of the female member is the receiving chamber 43. The female member typically includes one or more seals in the receiving chamber for engagement with the probe section of the male member. As shown in FIG. 1, metal radial seal 26 is held on shoulder 58 in the receiving chamber by seal retainer 23 which is a sleeve-shaped member that is inserted into the receiving chamber. The seal retainer may have a stepped internal diameter 68 with an internal shoulder 33 between the steps. The seal retainer may be locked in the female member by lock ring 35 which has threads 24 for engagement with mating threads of the female member. An additional seal, preferably elastomeric dovetail seal 22 may be included between the seal retainer and lock ring. Additionally, O-ring seal 25 can be used to seal the junction between the seal retainer and internal shoulder 19 in the female member.

The second section 34 of the central bore is adjacent and inboard from shoulder 58. The second section 34 of the bore and the internal diameter 68 of the seal retainer are dimensioned to allow sliding interfit with the probe section of a male coupling member.

Valve bore 39 is the section of the central bore adjacent the second end of the female member. The valve bore holds poppet valve 29. In the closed position, conical valve face 27 seals against valve seat 28. Valve spring 38 urges the poppet valve into the closed position. Spring collar 37 anchors the valve spring, and is held in place by snap ring or clip 40. The female member poppet valve slides within valve bore 39 in the female member. Extending from the apex of the conical valve face of the female member is valve actuator 42 which engages the corresponding valve actuator of the male member to urge the valves of both members into the open position.

The recessed flow passages 42 of the present invention are in the central bore between the second section 34 and the valve bore 39. The recessed flow passages are dimensioned between 1/16 and 1/4 inch greater in radius than the second section of the central bore. In the embodiment of FIGS. 1 and 2, the recessed flow passages form a single annular passage between the second section of the central bore and the valve bore of the female member.

Now referring to FIG. 2, male member 10 includes first end or leading face 49 of probe 50. The probe section terminates at flange 16. Only the probe section of the male member enters the receiving chamber in the female member of the coupling, and the flange limits further entry of the male member into the receiving chamber. Flow passages 22 may extend from the male member's internal bore to the outer circumference of the male member. The flow passages in the male coupling member may be radial or may be angled to prevent ingress of debris when the female member is disconnected and the male member remains subsea. Alternatively, the male coupling member may have longitudinal passages wherein the flow of hydraulic fluid is through the leading face.

The probe may have a stepped outer diameter, preferably first diameter 11 and second diameter 12 which is larger than the first diameter. The radial metal seal engages the first diameter of the male member and the elastomeric dovetail seal engages the second diameter. Shoulder 13 between the first and second diameters abuts shoulder 33 in the seal retainer.

When the male member is fully inserted into the female member, there is a gap 14 between the leading face 49 of the male member and internal shoulder 18. There also is a gap between the outer circumference of the probe and the internal diameter 70 of the recessed flow passage section of the central bore. These gaps provide the recessed flow passages 41 which are the subject of this invention. Preferably, the gaps are between 1/16 inch and 1/4 inch measured in radius. These gaps directly in front of and around the leading face of the male member are referred to and defined in this application as recessed flow passages 42.

In a preferred embodiment of the present invention, the recessed flow passages form a single annulus between the leading face of the probe section and the female member bore. Alternatively, multiple recessed flow passages may be used. Each of the recessed flow passages extend between first internal shoulder 17 and second internal shoulder 18.

Accordingly, the present invention provides a female undersea hydraulic coupling member having recessed flow passages to facilitate connection with male coupling members with various flow ports and flow passages. An advantage of the present invention is that it allows higher flow rates in couplings with radial or angled flow passages.

Although variations in the embodiment of the present invention may not each realize all of the advantages of the invention, certain features may become more important than others in various applications of the device. The invention, accordingly, should be understood to be limited only by the scope of the appended claims.

What is claimed is:

1. An undersea hydraulic coupling member comprising:
   (a) a cylindrical body with a central bore extending therethrough from a first end to a second end thereof, the central bore having a receiving chamber adjacent the first end, the receiving chamber having a first internal diameter;
   (b) the central bore having a second section adjacent the receiving chamber with a second internal diameter smaller than the first, internal diameter, an internal shoulder between the receiving chamber and second section;
   (c) a ring-shaped seal positioned on the internal shoulder, and a seal retainer engaged to the first end of the body section for retaining the ring-shaped seal on the internal shoulder;
   (d) the central bore having a valve bore adjacent the second end of the body, the valve bore having a slideable poppet valve inserted therein; and
   (e) the central bore having at least one recessed flow passage between the valve bore and the second section of the central bore, the recessed flow passage having radial dimensions greater than the second section of the bore to provide fluid passage between the second section of the internal bore and the valve bore.

2. The undersea hydraulic coupling member of claim 1 wherein the recessed flow passage has an annular shape.

3. The undersea hydraulic coupling member of claim 2 wherein the recessed flow passage has a diameter smaller than the receiving chamber.

4. The undersea hydraulic coupling member of claim 2 wherein the recessed flow passage is at least 1/16 inch in radius greater than the second section of the bore.

5. A female undersea hydraulic coupling member comprising:
   (a) a body having a first end and a second end and a longitudinal bore between the first and second ends, at least one radial ring-shaped seal in the longitudinal bore adjacent the first end, and a seal retainer engaged to the first end of the body for holding the radial ring-shaped seal in the longitudinal bore, the ring shaped seal and seal retainer each having an internal diameter;

(b) the longitudinal bore defining a valve bore adjacent the second end of the body, a poppet valve in the valve bore, the poppet valve biased to seal against a valve seat; and (c) a recessed flow passage between the valve seat and the receiving chamber, the recessed flow passage having a generally annular shape and being dimensioned to have an internal diameter greater than the internal diameters of the ring-shaped seal and seal retainer.

6. The female undersea hydraulic coupling member of claim 5 wherein the recessed flow passage extends between a pair of internal shoulder surfaces.

7. An undersea hydraulic coupling member comprising:

(a) a body having a first end and a second end, a central bore, a sealing member in the central bore adjacent the first end of the body the sealing member including a radial seal and a seal retainer from holding the radial seal in the central bore and a valve in the central bore adjacent the second end of the body for controlling hydraulic fluid flow through the central bore; and (b) a recessed flow passage in the central bore between the sealing member and the valve, the recessed flow passage having an internal diameter greater than the sealing member.

8. The undersea hydraulic coupling member of claim 7 wherein the seal retainer has a stepped internal diameter.

9. The undersea hydraulic coupling member of claim 7 wherein the radial seal is pressure energized.

10. The undersea hydraulic coupling member of claim 7 wherein the sealing member comprises at least two ring-shaped seals.

* * * * *